(12) United States Patent
Baughman et al.

(10) Patent No.: US 11,614,795 B2
(45) Date of Patent: Mar. 28, 2023

(54) CO-EVOLVED USER EXPERIENCE ORCHESTRATOR

(71) Applicant: INTERNATIONAL BUSINESS MACHINES CORPORATION, Armonk, NY (US)

(72) Inventors: Aaron K. Baughman, Cary, NC (US); Hernan A. Cunico, Holly Springs, NC (US); John M. Ganci, Jr., Raleigh, NC (US); Martin G. Keen, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 147 days.

(21) Appl. No.: 17/118,883

(22) Filed: Dec. 11, 2020

(65) Prior Publication Data
US 2022/0187902 A1    Jun. 16, 2022

(51) Int. Cl.
*G06F 16/9535* (2019.01)
*G06F 3/01* (2006.01)
*G06F 16/28* (2019.01)

(52) U.S. Cl.
CPC .......... *G06F 3/011* (2013.01); *G06F 16/285* (2019.01); *G06F 16/288* (2019.01); *G06F 16/9535* (2019.01)

(58) Field of Classification Search
CPC ...... G06F 3/011; G06F 16/285; G06F 16/288; G06F 16/9535
See application file for complete search history.

(56) References Cited

U.S. PATENT DOCUMENTS

| | | | |
|---|---|---|---|
| 9,946,795 B2 | 4/2018 | Marvit | |
| 10,304,003 B2 | 5/2019 | Baughman | |
| 10,322,349 B2 | 6/2019 | Cohen | |
| 10,373,064 B2 | 8/2019 | Mascaro | |
| 10,620,695 B2 | 4/2020 | Baughman | |
| 11,020,671 B2* | 6/2021 | Cruz | H04L 67/131 |
| 11,065,542 B2* | 7/2021 | Andall | A63F 13/352 |
| 2012/0072289 A1 | 3/2012 | Pradeep | |
| 2013/0144537 A1 | 6/2013 | Schalk | |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Jeff Piziali
(74) *Attorney, Agent, or Firm* — Robert D. Bean

(57) ABSTRACT

According to one embodiment, a method, computer system, and computer program product for customizing a mixed reality experience based on the experiential state of users in a queue to join the mixed reality experience or immersed in the mixed reality experience is provided. The present invention may include modeling the experiential state of the at least one user participating in the mixed-reality experience; modeling one or more relationships between the experiential state of the at least one user and one or more physical or virtual experience parameters comprising the mixed-reality experience; based on the one or more modeled relationships, predicting one or more alterations to the one or more physical or virtual experience parameters to enhance the experiential state of the at least one user; and operating a mixed reality system to perform one or more remedial actions to execute the one or more predicted alterations.

20 Claims, 6 Drawing Sheets

(56) References Cited

U.S. PATENT DOCUMENTS

| | | |
|---|---|---|
| 2017/0099592 A1 | 4/2017 | Loeb |
| 2017/0171690 A1 | 6/2017 | Kim |
| 2017/0296929 A1* | 10/2017 | Chandrasekaran ..... A63F 13/75 |
| 2019/0163259 A1* | 5/2019 | Baughman .............. G06T 13/80 |
| 2019/0306661 A1 | 10/2019 | Deluca |
| 2020/0000817 A1 | 1/2020 | Loutit |
| 2020/0008171 A1 | 1/2020 | Jagannathan |
| 2020/0155947 A1 | 5/2020 | Panesar |
| 2022/0044510 A1* | 2/2022 | Reynolds ............... G06Q 50/30 |

* cited by examiner

US 11,614,795 B2

CO-EVOLVED USER EXPERIENCE ORCHESTRATOR

BACKGROUND

The present invention relates, generally, to the field of computing, and more particularly to mixed reality.

Mixed reality is a field concerned with merging real and virtual worlds such that physical and digital objects co-exist and interact in real time. Mixed reality does not exclusively take place in either the physical or virtual worlds, but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed reality has found practical applications in remote working, military and commercial training, games, and hybrid amusement-park-style rides.

SUMMARY

According to one embodiment, a method, computer system, and computer program product for customizing a mixed reality experience based on the experiential state of users in a queue to join the mixed reality experience or immersed in the mixed reality experience is provided. The present invention may include modeling the experiential state of the at least one user participating in the mixed-reality experience; modeling one or more relationships between the experiential state of the at least one user and one or more physical or virtual experience parameters comprising the mixed-reality experience; based on the one or more modeled relationships, predicting one or more alterations to the one or more physical or virtual experience parameters to enhance the experiential state of the at least one user; and operating a mixed reality system to perform one or more remedial actions to execute the one or more predicted alterations.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
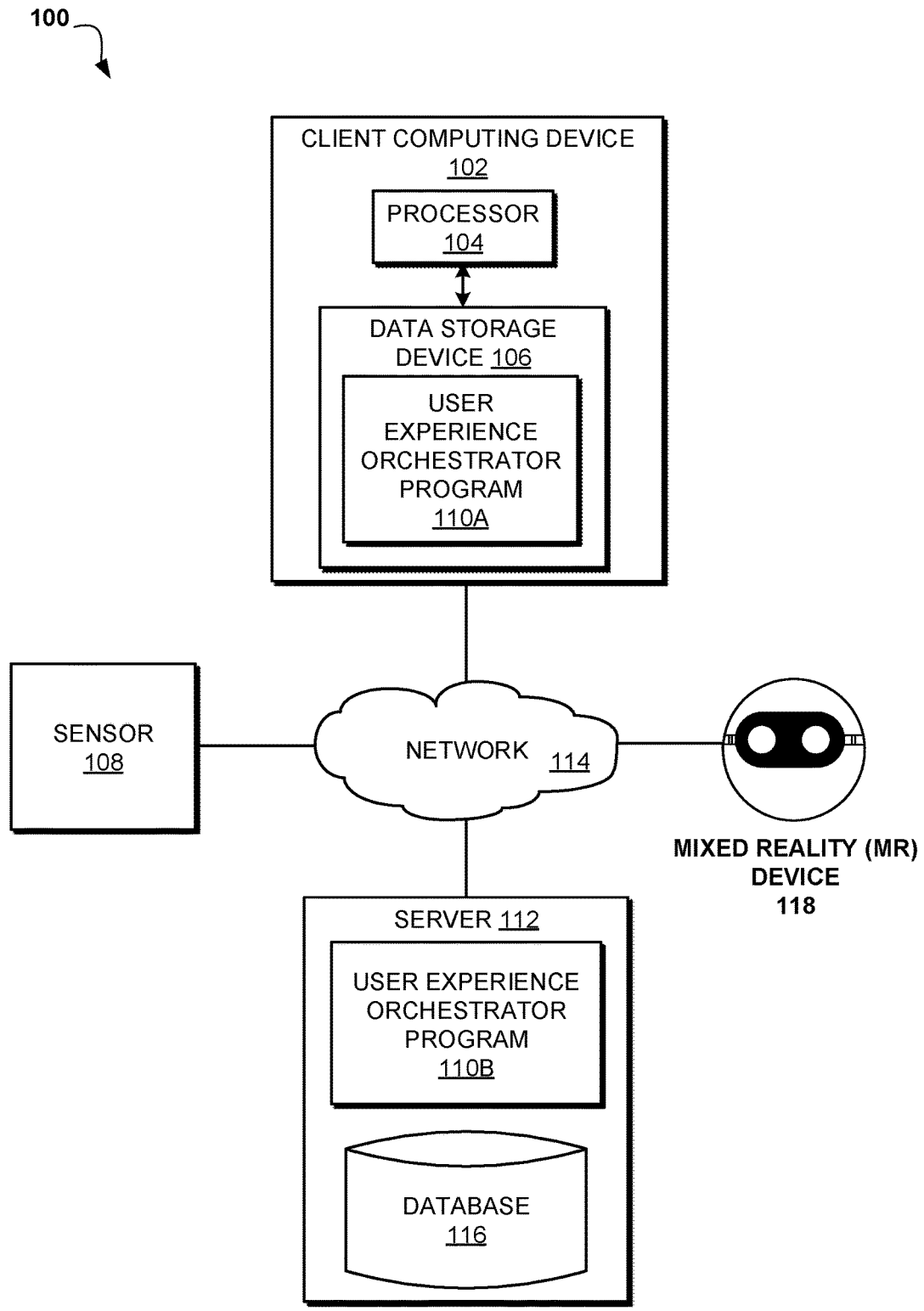
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to mixed reality. The following described exemplary embodiments provide a system, method, and program product to, among other things, analyze the current state of a user participating in a mixed-reality (MR) experience, derive user preferences from previous experiences, and thereby predict what parameters of the MR experience could be altered to improve the user's experience. Therefore, the present embodiment has the capacity to improve the technical field of mixed reality by accurately identifying and executing dynamic and micro-based adjustments to crucial attributes of a user experience to arrive at a single adjustment tailored to an individual; this in turn has the potential to take MR entertainment experiences to a level of customization and user enjoyment previously unattainable by traditional rides and entertainment systems.

As previously described, mixed reality is a field concerned with merging real and virtual worlds such that physical and digital objects co-exist and interact in real time. Mixed reality does not exclusively take place in either the physical or virtual worlds, but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed reality has found practical applications in remote working, military and commercial training, games, and hybrid amusement-park-style rides.

Entertainment industry mainstays such as Universal Studios® (Universal Studios® and all Universal Studios®-based trademarks and logos are trademarks or registered trademarks of Universal Studios, Inc. and/or its affiliates) and Disney® (Disney® and all Disney®-based trademarks and logos are trademarks or registered trademarks of Disney Enterprises, Inc. and/or its affiliates) have been increasingly moving into VR and AR space to create mixed reality experiences that are new and distinct from the more traditional "physical" rides. With limited on-the-fly customization of options, traditional rides offer very little variation from one instance to the next. Some rides attempt to introduce variation by randomizing several variables within a limited range; for example, Hollywood Tower Hotel ride in Disney Studios utilizes a randomizer system that controls which chute the elevator car is going to drop from, the duration and acceleration of the elevator's descent, and the number of drops. However, such approaches do not offer individualized variation, but rather variations that are randomized and applied equally to a group of participants.

Mixed reality offers the potential to make greater levels of individualization and variety possible, but mixed reality "rides" have so far largely fallen short. For example, the New Revolution Galactic Attack® (Galactic Attack® and all Galactic Attack®-based trademarks and logos are trademarks or registered trademarks of Six Flags Theme Parks, Inc. and/or its affiliates) at two Six Flags® (Six Flags® and all Six Flags®-based trademarks and logos are trademarks or registered trademarks of Six Flags Theme Parks, Inc. and/or its affiliates) parks utilize an Oculus® (Oculus® and all Oculus®-based trademarks and logos are trademarks or registered trademarks of Facebook Technologies, LLC and/or its affiliates) VR headset that plays the same VR experience for every rider, and allows for no variation or customization between riders. With wider adoption of VR and AR in the industry, there is an opportunity to take these experiences to new levels that were not possible before with traditional systems. As such, it may be advantageous to, among other things, implement a system that utilizes sensors embedded in the equipment and/or environment of a mixed reality entertainment experience to gather data regarding the user, use the gathered data, historical user preferences, and various types of analysis to model the multiple dimensions comprising the user's experience, identify the individual parameters of the mixed reality experience that correlate with strong user experiences, and alter virtual and/or physical parameters of the mixed-reality experience for the individual user to improve that user's mixed reality experience in a precise and tailored fashion. It may also be advantageous to implement a system which distinguishes between and measures the experience of users both in line for the mixed reality experience and currently experiencing the mixed reality experience, determines the effect that parameter adjustments on one user produce in the experience of another user, and implements parameter adjustments to one user designed to improve the user experience of a separate user, thereby improving the user experience of all users participating in the mixed reality experience, whether they be currently participating in the mixed reality experience or waiting their turn in line.

According to one embodiment, the invention may be a system for measuring the experiential state of a user participating in a mixed-reality experience, correlating spikes in the user's experiential state with particular features comprising the mixed reality experience, and predicting changes to the mixed reality experience that would improve the experiential state of the user.

As described herein, a user may be any individual participating in a mixed reality experience or part of a queue to join a mixed reality experience. A participant may be any individual who is taking part in the mixed reality experience.

In some embodiments of the invention, the mixed reality experience may be an entertainment experience that comprises any combination of both virtual and physical elements. Physical elements may include the real-world tangible components of the experience, including vehicles such as gondolas, trams, rollercoasters, monorails, locomotives, dodgems, et cetera; mechanisms or structures designed to rotate, tilt, swing, invert, drop, or otherwise physically manipulate participants such as motion simulator platforms, centrifuges, drop towers, swings, pendulums, et cetera; terrain features; props or equipment such foam swords or infrared laser tag guns or rollerblades; features of the physical environment such as lighting, railings, smoke effects, signage, et cetera; buildings and structures; and so on. Virtual elements may include the digital components of the virtual experience that are modelled in a virtual environment which may be mapped to or otherwise correspond with places and objects within the physical world, including virtual scenes such as haunted house, battlefield, racetrack, et cetera; virtual setpieces such as avalanches, horse races, monster attacks, et cetera; augmented reality elements such as safety instructions, advertisements, navigational instructions, virtual signage, et cetera; virtual creatures such as pets or monsters, et cetera. Virtual elements may be interactive, responding to a participant's movement, speech, orientation, et cetera.

Participants may be able to perceive the virtual elements via devices such as VR headsets, smart glasses, tablets, mobile phones, et cetera, which may be general purpose devices owned by users or may be customized or specialized for an individual mixed reality experience or class of mixed reality experiences. The ratio of virtual elements to physical elements may vary considerably; for example, on one end of the spectrum, the mixed reality experience may be largely virtual with minimal physical elements, such as an interactive virtual environment mapped to a physical location such that the movement of one or more participants in the virtual environment is mapped to their location and movement in the physical world. On the other end of the spectrum, a mixed reality experience may be largely physical with minimal virtual elements, such as a rollercoaster with virtual safety warnings, instructions, and ingress-egress points overlaid onto the cars.

The mixed-reality experience may accommodate a limited number of participants, and may therefore employ a queue system to track individuals who are waiting to take part in the mixed reality experience. The queue may be physical, ordering individuals in a line corresponding with the order in which the individuals will be allowed to enter the mixed reality experience, or the queue may be virtual, digitally tracking the individuals in the line, as identified, for example, by name, face, assigned ID number, et cetera, and the order in which they are allowed to enter the mixed reality experience. The queue may also be a mixture of both, for instance keeping individuals in the queue within a designated area but tracking their place in line digitally. The queue may further comprise some means of alerting the individual of their place in line and/or when their turn has been reached to enter the mixed reality experience.

Of the virtual and physical elements comprising a mixed-reality experience, the subset of elements that can be individually manipulated or altered to customize or change the mixed reality experience for all participants or some subset of participants, including individual participants, may be herein referred to as experience parameters. The experience parameters may be virtual or physical, and may include lighting in both physical and digital environments, speed and acceleration of vehicles, movement choreography of motion platforms or other mechanical devices, audio volume, duration of the experience, et cetera. The granularity of experience parameters with respect to the number of participants affected may vary based on the experience parameter. In other words, the most granular experience parameters may be manipulated or altered on a participant-by-participant basis to customize individual participant's experiences, whereas manipulation or alteration of less granular experience parameters may change the mixed reality experience of a larger subset of participants. For example, in a mixed reality experience comprising a physical locomotive where the windows of passenger compartments are overlaid with virtually modelled landscapes, changes to the speed of the locomotive must necessarily affect all passengers, while changes to the virtual landscape on the windows may be customized for each individual passenger.

In some embodiments of the invention, the experiential state of a user, herein also referred to as a User Experience Coefficient or UXC, may be a value quantifying the overall experience of the user within the context of the mixed reality experience on a spectrum, where values towards one end of the spectrum represent unpleasant or poor user experiences, and values on the other end of the spectrum represent positive user experiences. The experiential state may be calculated or updated continuously at regular time intervals throughout the user's time waiting in the queue or taking part in the mixed reality experience, such that the user's experiential state may be modelled over time. The experiential state may be calculated based on a variety of information that may indicate the mental state of the user, and information that indicates the extent to which a given mental state of the user corresponds with a positive experience or a negative experience. Information that may indicate the mental state of the user may include, for example, biometric data of the user, spatial data of the user, stress analysis of the user, sentiment analysis of the user, et cetera. Information that indicates an extent to which a given mental state of the user corresponds with positive or negative experiences may include crowdsourced or historical data, user feedback, machine learning, user preferences, et cetera.

In some embodiments of the invention, the system may calculate two different experiential states; one experiential state calculated from data gathered when the user was in the queue, and one experiential state calculated from data gathered while the user was taking part in the MR experience. In some embodiments, the system may annotate gathered data indicating whether the data was gathered while the user was in the queue or the MR experience.

Biometric data may be any data pertaining to physiological traits or behavioral characteristics of a user. Biometric data may include heart rate variations, breathing rate variations, blood pressure, skin hidrosis, diaphoresis, fingerprints, height, pupil dilation, retinal patterns, etc. Biometric data may be collected by sensors, such as cameras or fingerprint readers in users' mobile devices, cameras installed within a threshold distance of the physical location of the mixed reality experience, cameras or other sensors integrated into the mixed reality device such as a virtual reality headset, vitality data from wearable vitality trackers, et cetera. In some embodiments, the system may continuously gather biometric data pertaining to one or more users, up to and including all users, at regular intervals. The system may gather biometric data in real time or substantially real time.

Spatial data may be data pertaining to the position, orientation, and distance between physical objects, including individuals such as the user. Spatial data may be derived from an aggregation of geo location features available in the smart/wearable devices of users or other individuals within a threshold distance of a physical location of the mixed reality experience, where geo location features may be software agents capable of deducing the geographical location of a device connected to the Internet, for example using the IP address, MAC address, et cetera. Spatial data may also include geolocation data gathered by sensors such as global positioning systems, microlocation data gathered via near field communications, Bluetooth, RFID tags, beacons, et cetera, and any other location data gathered for instance via cameras and motion detectors, laser rangefinders, et cetera. In some embodiments, the system may continuously gather spatial data pertaining to one or more users, up to and including all users, at regular intervals. The system may gather spatial data in real time or substantially real time.

Communications data may be user text conversations, extracted for instance from messaging applications on a user's mobile device, or, in embodiments where the system employs a chatbot, text conversations conducted directly between the user and the system. Communications data may further include the user's audible speech, as for example recorded by microphones in the user's mobile devices, MR devices, or deployed in the environment of the mixed reality experience. In some embodiments, the system may continuously gather communications data pertaining to one or more users, up to and including all users, at regular intervals. The system may gather communications data in real time or substantially real time.

Sentiment analysis may be a method of inferring the current view or attitude of a user towards the mixed-reality experience or any of the virtual or physical elements comprising the mixed-reality experience. Sentiment analysis may include processing communications data pertaining to a user using text processing techniques such as entity and corpus linguistic methods and/or speech processing methods to determine the user's sentiment at any given moment during the user's participation in the mixed reality experience; the system may further attempt to determine whether the sentiment is directed towards the mixed reality experience, and if so, what mixed reality elements the sentiment is particularly directed to. In some embodiments, the system may continuously perform sentiment analysis on all users or a subset of users, at regular intervals. The system may perform sentiment analysis in real time or substantially real time.

Stress analysis may be a method of determining the stress, or cognitive workload, affecting a user. In some embodiments, the system may perform stress analysis on the biometric data to determine a mental state; a user may indicate a level of stress through their behavior and/or through involuntary physiological changes. For example, heart rate variations, breathing rate variations, blood pressure, skin hidrosis, diaphoresis, and pupil dilation may all indicate a level of cognitive workload experienced by the user. In some embodiments, the system may continuously perform stress analysis on all users or a subset of users, at regular intervals. The system may perform stress analysis in real time or substantially real time.

In some embodiments, the system may determine whether a given user is in the queue or is taking part in a mixed-reality experience. In some embodiments, such as where the queue is a logical construct implemented on software, the system may consult the queue to determine whether the user is identified among the users within the queue; if the user is identified within the queue, the system may conclude that the user is in the queue. In some embodiments, such as where the queue is physical, the system may use the spatial data and image processing to identify whether the user is present in the physical location associated with the queue, and/or use biometric data to determine whether the user is exhibiting behaviors consistent with waiting, such as standing in a line of other users and/or standing still for long periods of time, et cetera. The system may determine if the user is taking part in the MR experience by, for example, consulting the queue and/or past versions of the queue to determine if the user recently reached the first position in line before being taken off the queue, and/or use sensors to identify the user as wearing a mixed reality device, being physically present within the bounds delineated for the mixed reality experience, et cetera. The system may make this determination continuously at regular intervals, and may track the position of users relative to the queue or the MR experience in real time or substantially real time.

In some embodiments of the invention, the system may perform a queue analysis to determine which individuals waiting to enter a mixed reality experience should be considered users of a mixed reality experience for the purposes of including them within the co-evolution step of the user experience orchestration process. The co-evolution step may be a step where the system uses the experiential state or alterations to the experience parameters of participants to facilitate communication with or alter the experiential state of users in the queue, or to attract individuals to join the queue and become users. The system may identify individuals waiting to enter the mixed reality experience as users based on the immediateness of the participant about to initiate the experience, and may perform initial categorization and user pre-classification based on historic experiences. In the case of a ride with multiple cars (vehicles), then the system may consider the characteristics of the riders of each car, and categorize, for example by average, those characteristics of the riding cohort and map to those comparable characteristics of individuals still waiting in the queue. The similarity between users in the vehicle and users in the queue may be represented as categorization affinity. This categorization affinity may be employed when the system cannot find a 100% match so needs to find a compromise for a shared car. For example, if the system has place in a car for 10 riders but cannot find 10 riders in the queue with the same preferences, then it will start going up in the hierarchy of the categorization for the monitored characteristics to find a categorization that is common, generic enough but still compatible among the riders in queue, as represented by users with the highest categorization affinity. This categorization analysis may apply when the system is making the selection of what riders in the queue should be put together on a car. For example the queue analysis may include pre-selection of a vehicle based on participant categorization affinity, or ca. This ca value is a contingency parameter needed when vehicles have limited or low intersecting configuration parameters. For example, one vehicle accepts X values between 20 and 60, and another vehicle accepts X values between 50 and 90. This value is important in pre-selecting a function of User Experience Coefficient (UXC) defined in the next step. The system may determine a line break point beyond which individuals in the queue might be too far back to initiate in the experience. This returns a headcount number h, which may represent the number of individuals within the line break point. The system may calculate a critical mass coefficient k, which may be a dynamically calculated threshold indicating the minimum set of participants needed in a queue. k may calculated in function of vehicles available c, duration of the experience d, time for the participants to move in and out t, and the number of participants needed to maximize utilization of vehicle n. Possible values include:

$k=1$ critical mass
$k<1$ subcritical mass
$k>1$ supercritical mass

The outputs from the line analysis step may be ca, h, and k. These values will be used later when deriving the CUE-O and remediation models depending on what remediation methods are called for in a given situation. For example, the ca can be used to "water down" some of the runtime parameters in order to scale back an intensity of a mixed reality experience to satisfy participants with similar characteristics, where characteristics may include user preferences, for example with regard to individual experience parameters and/or broader effect or aesthetic created or modified by an experience parameter or group of experience parameters. If there isn't critical mass, then the system might opt to run a randomizer function instead of a personalization function.

In some embodiments of the invention, the system may create a model to provide a mapping between salient features of the user's experiential state, or UXC, over time, and experience parameters to which they correspond. This model may be referred to as the experience enhancing drivers model, or UXD. The UXD may identify one or more salient features by consulting the UXC over time and identifying regions where the UXC exceeded an upper threshold or fell below a lower threshold, where for example the upper threshold represents a value of the experiential state above which the experiential state can be considered to represent a positive experience, and the lower threshold indicates a value of the UXC below which the UXC can be considered to represent a negative experience. Additional thresholds may be employed, and the thresholds may be established or adjusted, for example, based on machine learning or user feedback. The UXD may be pre-provided with experience parameter information, which may include a list of all experience parameters present and/or controllable by the system, and may include contextual information regarding experience parameters that may be helpful in determining whether and when a user encountered a given experience parameter. For example, the contextual information may include the location of experience parameters that are bound to a location, or the location of experience parameters that are mobile (train, virtual creature) at regular intervals. For more abstract experience parameters, such as motion, visual or audio effects, traits such as speed or acceleration, et cetera, the contextual information may include the times at which the effects or conditions were present and/or the users or area affected by the effects or conditions. The UXD may compare the time intervals corresponding with the salient features to the user's location during those time intervals. The UXD may determine what experience parameters were visible to the user, producing an effect on the user, or otherwise present in the vicinity of the user such that the experience parameter may have contributed to the salient feature of the user's UXC, and may mark such experience parameters as potential experience parameters. For example, the UXD may use cameras to identify where the user was looking, and may identify all visible experience parameters in that direction as potential experience parameters. In some embodiments of the invention, the UXD outputs all potential experience parameters associated with the salient features. In some embodiments the UXD may use machine learning methods to identify a likelihood that any given potential experience parameters contributed to or caused the salient feature in the user's UXC based on patterns previously identified; for example, the UXD may determine a likelihood based on whether the same type of experience parameters produced a similar effect on the experiential state of similar users in the past, whether the same type of experience parameters produced a similar effect on the experiential state of the same user in the past, et cetera.

In some embodiments of the invention, if the UXC curve is flat, or without significant variations, representing boredom or a lack of strong feelings or reactions on the part of the user, then the system might adjust runtime parameters to "shake" the UXC; in other words, the system might adjust runtime parameters that may be likely to affect the user's experiential state in a positive way, as determined in conjunction with historic understanding of previous UXCs for the user and/or comparable users, in an attempt to improve the user's experiential state or to gather information on the relationship between the user's experiential state and alterations to experience parameters.

In some embodiments of the invention, the system creates a co-evolved user experience orchestrator (CUE-O) model from the UXC and the output of the UXD. The CUE-O models represent the relationship between the different experience parameters and how the users respond to them. This model also provides a communication and information exchange method between the users participating in the experience and those waiting in line. The CUE-O model enables the system to analyze in real time the user's current state, derive user preferences from previous experiences and predict what parameters could be altered that will result in a better experience.

In some embodiments of the invention, the system may use the CUE-O model may derive user preferences by analyzing the experience parameters corresponding with salient features of the user's experiential state and determining which experience parameters produce a positive effect on the user's experience, and which experience parameters have a negative effect on the user's experience. The system may predict changes to the experience parameters that would produce a positive effect on the user's experiential state, based on, for example, how changes to such experience parameters affected the experiential state of similar users in the past. Additionally, based on analysis of UXDs belonging to many users over time, the system may identify relationships between experience parameters, such that a user's positive or negative experiences with certain experience parameters or combinations of experience parameters may be predictive of how related experience parameters may affect the user's experiential state. As an example, from the calculated User Experience Coefficient (UXC), the system can derive that User A loves experience parameters associated with fast rides but hates experience parameters associated with things that makes him feel dizzy. The system may therefore predict that adjusting the virtual experience parameters to minimize dizziness during the mixed reality experience would have a positive effect on User A. The system may further predict that adjusting other experience parameters to increase the intensity of the mixed reality experience would further improve User A's experience. In another example, User A is excited for the last ride of the day; the system knows that User A exhibits a predilection for thrill-seeking. The system may accordingly predict that adjustments to the experience parameters to maximize the thrilling characteristics of the experience that particularly resonate with the profile of the user, for example speed and acceleration of the ride, or aggressiveness of monsters within a virtual environment, would improve the experience of User A. In another example, User A recently ate lunch and is prone to motion sickness; the system may predict that reducing the intensity of key experience parameters may maximize User A's comfort during the experience. In some embodiments of the invention, experience parameters which are related, such that changes to all related experience parameters produce a unified effect on a user's experience, may be grouped together. For example, experience parameters such as speed, acceleration, vibrancy of a virtual environment, volume, aggression of virtual monsters, et cetera may all be relevant to the intensity of the experience, such that increasing all such parameters increases the intensity, and decreasing the parameters decreases intensity, and may be grouped together. Another grouping of experience parameters might be tied to whimsey, or calmness, or scariness, depending on the experience parameters and the nature of the mixed reality experience.

In some embodiments of the invention, the system may user the CUE-O model to perform co-evolution, which may include facilitating interaction between participants and users in the queue to improve the experiential state for one or both groups. In other words, co-evolution may be taking input from those waiting in the queue and changing the runtime parameters accordingly for those in the actual ride, to change the experience for those in the ride, which then is relayed to those in the queue ultimately improving their pre-ride experience. Co-evolution may include providing a feedback loop between those experiencing the ride and those waiting to get in, which may include adjusting the mixed reality experience for a participant based on the experiential state of users in the queue. For example, if User B waiting in line is too calm and doesn't seem interested in the experience, the system could alter experience parameters to increase the intensity of the mixed reality experience that User A is currently taking part in. The altered experience parameters for User A may be kept for User B for when User B takes part in the MR experience. Co-evolution may also include communicating the experiential state of participants to users in the queue to improve the experiential state of the users in the queue. This communication may be something as simple as broadcasting, on displays visible to those in the queue, how much the users in the ride are "screaming" in excitement (or panic). This "communication" would affect the experiential state of those in the queue, potentially making them feel more excited for the MR experience. Other ways to communicate may include using mobile apps that share some UXC information. In some embodiments, the system may change the ambience lighting to communicate UXC to those in the queue; then, by observing the responses by those in the queue, the system may alter the runtime parameters. Co-evolution communication may take place where there is a match (or affinity) between those in the queue and those in the ride.

In some embodiments of the invention, the system may execute remedial actions to implement the predicted changes to the mixed reality experience. The remedial actions may be any actions that serve to carry out the predicted changes to the experience parameters. The invention may electronically interface with mechanical and software components of the mixed reality experience such that the system may send commands to execute the changes in both hardware and software environments. In some embodiments to the invention, alterations to grouped experience parameters may be executed simultaneously. In embodiments where changes to an experience parameter would affect multiple participants, the system may only make the changes where the system predicts that the changes would have a neutral or positive effect on the experiential state of all affected participants. In some embodiments, for example where queue analysis determines that the number of users in the queue is below a desired number, the system may communicate with nearby individuals with compatible experiential states to join the queue, for example utilizing synthesized or recorded speech through speakers, messages to the user's mobile device, via displays, augmented reality graphical elements, et cetera.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze the current state of a user participating in a mixed-reality (MR) experience, derive user preferences from previous experiences, and thereby predict what parameters of the MR experience could be altered to improve the user's experience.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102, servers 112, sensors 108, and mixed reality (MR) devices 118, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a user experience orchestrator program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. In some embodiments, client computing device 102 may be a mixed reality device 118 and/or may be integrated into a mixed reality device 118. As will be discussed with reference to FIG. 4, the client computing device 102 may include internal components 402a and external components 404a, respectively.

Mixed reality (MR) device 118 may be any device which allows a user to perceive a mixed reality environment; the mixed reality device 118 may be any device equipped with a display that can render a virtual environment, and hardware or software that enables the device to track its location and motion relative to the physical world, and by extension relative to virtual objects mapped to locations in the physical world. The mixed reality device 118 may be a general-purpose device owned by users or may be customized or specialized for an individual mixed reality experience or class of mixed reality experiences. Mixed reality devices 118 may include such devices as VR headsets, AR headsets, smart glasses, tablets, mobile phones, et cetera. Users may wear or utilize mixed reality devices 118 while taking part in the mixed reality experience, and may or may not wear or utilize mixed reality devices 118 while waiting in the queue. In some embodiments, a user may employ multiple different mixed reality devices 118 over the course of waiting in the queue and participating in the mixed reality experience. Mixed reality device 118 may be enabled to communicate with user experience orchestrator program 110A, 110B residing within client computing device 102 and/or server 112 via the communication network 114, in accordance with one embodiment of the invention.

Sensor 108 may be any device capable of recording data that is relevant to stress analysis, sentiment analysis, line analysis, and the experiential state of a user, which may include spatial data, communications data, biometric data, et cetera. As such, sensors 108 may be integrated into mixed reality device 118, client computing device 102, sensors 112, and may be deployed in the environment of the mixed reality experience and/or of the queue outside the mixed reality experience. Sensors 108 may include cameras, fingerprint readers, pupil or retinal scanners, scales, global positioning systems, RFID tags, motion detectors, laser rangefinders, microphones, et cetera. The sensors 108 may be enabled to communicate with user experience orchestrator program 110A, 110B residing within client computing device 102 and/or server 112 via the communication network 114, in accordance with one embodiment of the invention.

The server computer 112 may be a laptop computer, netbook computer, personal computer (PC), a desktop computer, or any programmable electronic device or any network of programmable electronic devices capable of hosting and running a user experience orchestrator program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the user experience orchestrator program 110A, 110B may be a program enabled to analyze the current state of a user participating in a mixed-reality (MR) experience, derive user preferences from previous experiences, and thereby predict what parameters of the MR experience could be altered to improve the user's experience. The user experience orchestrator may be located on client computing device 102 or server 112 or on any other device located within network 114. Furthermore, user experience orchestrator may be distributed in its operation over multiple devices, such as client computing device 102 and server 112. The user experience orchestration method is explained in further detail below with respect to FIG. 2.

Figure 2:
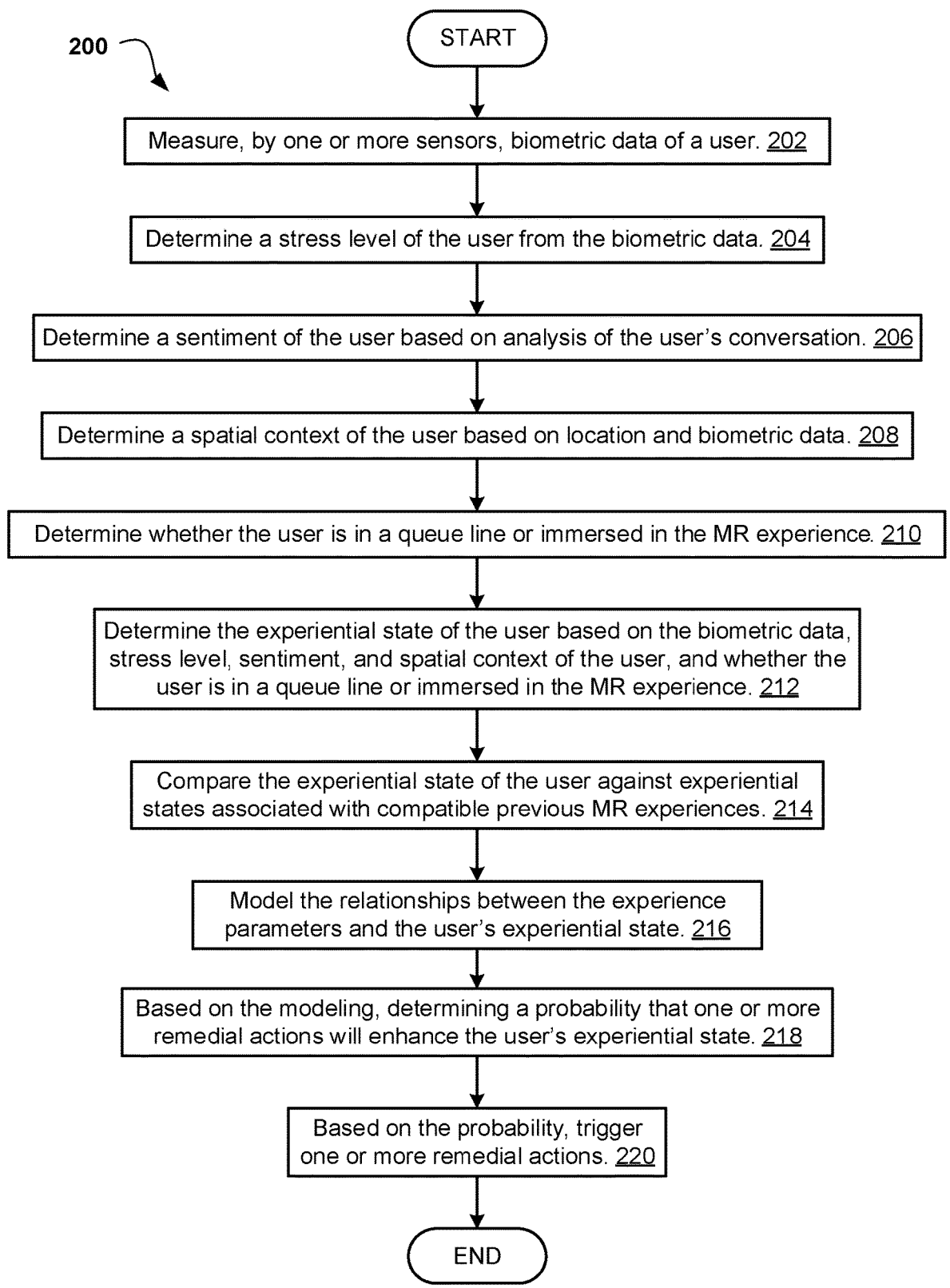
FIG. 2 is an operational flowchart illustrating a user experience orchestration process according to at least one embodiment.

Referring now to FIG. 2, an operational flowchart illustrating a user experience orchestration process 200 is depicted according to at least one embodiment. At 202, the user experience orchestrator program 110A, 110B measures, by one or more sensors, biometric data of a user. The user may be an individual participating in a mixed reality (MR) experience; an individual may be considered to participate in a MR experience if the individual is immersed in the MR experience or is in a queue of individuals waiting to enter the MR experience. Biometric data may be any data pertaining to physiological traits or behavioral characteristics of a user. Biometric data may include heart rate variations, breathing rate variations, blood pressure, skin hidrosis, diaphoresis, fingerprints, height, pupil dilation, retinal patterns, etc. The user experience orchestrator program 110A, 110B may gather biometric data through sensors 108, such as cameras or fingerprint readers in users' mobile devices, cameras installed within a threshold distance of the physical location of the mixed reality experience, cameras or other sensors integrated into the mixed reality device such as a virtual reality headset, vitality data from wearable vitality trackers, et cetera. In some embodiments, the user experience orchestrator program 110A, 110B may continuously gather biometric data pertaining to one or more users, up to and including all users, at regular intervals. The user experience orchestrator program 110A, 110B may gather biometric data in real time or substantially real time.

At 204, the user experience orchestrator program 110A, 110B may determine a stress level of the user from biometric data. Stress analysis may be a method of determining the mental stress, or cognitive workload, affecting a user. In some embodiments, the user experience orchestrator program 110A, 110B may perform stress analysis on the biometric data to determine a mental state; a user may indicate a level of stress through their behavior and/or through involuntary physiological changes. For example, heart rate variations, breathing rate variations, blood pressure, skin hidrosis, diaphoresis, and pupil dilation may all indicate a level of cognitive workload experienced by the user. In some embodiments, the user experience orchestrator program 110A, 110B may continuously perform stress analysis on all users or a subset of users, at regular intervals. The user experience orchestrator program 110A, 110B may perform stress analysis in real time or substantially real time.

At 206, the user experience orchestrator program 110A, 110B may determine a sentiment of the user based on analysis of the user's conversation. Sentiment analysis may be a method of inferring the current view or attitude of a user towards the mixed-reality experience or any of the virtual or physical elements comprising the mixed-reality experience. The user experience orchestrator program 110A, 110B may perform sentiment analysis by processing communications data pertaining to a user using text processing techniques such as entity and corpus linguistic methods and/or speech processing methods to determine the user's sentiment at any given moment during the user's participation in the mixed reality experience; the user experience orchestrator program 110A, 110B may further attempt to determine whether the sentiment is directed towards the mixed reality experience, and if so, what mixed reality elements the sentiment is particularly directed to. In some embodiments, the user experience orchestrator program 110A, 110B may continuously perform sentiment analysis on all users or a subset of users, at regular intervals. The user experience orchestrator program 110A, 110B may perform sentiment analysis in real time or substantially real time.

At 208, the user experience orchestrator program 110A, 110B may determine a spatial context of the user based on one or more geolocation features. The spatial context may be information describing the position, orientation, and distance between physical objects, including individuals such as the user. Spatial context may be determined from spatial data which may be derived from an aggregation of geo location features available in the smart/wearable devices of users or other individuals within a threshold distance of a physical location of the mixed reality experience, where geo location features may be software agents capable of deducing the geographical location of a device connected to the Internet, for example using the IP address, MAC address, et cetera. Spatial data may also include geolocation data gathered by sensors 108 such as global positioning systems, microlocation data gathered via near field communications, Bluetooth, RFID tags, beacons, et cetera, and any other location data gathered for instance via cameras and motion detectors, laser rangefinders, et cetera. In some embodiments, the user experience orchestrator program 110A, 110B may continuously gather spatial data pertaining to one or more users, up to and including all users, at regular intervals. The user experience orchestrator program 110A, 110B may gather spatial data in real time or substantially real time.

At 210, the user experience orchestrator program 110A, 110B may determine whether the user is in a queue line or immersed in the MR experience. In some embodiments, such as where the queue is a logical construct implemented on software, the user experience orchestrator program 110A, 110B may determine whether the user is in a queue by consulting the digital representation of the queue to determine whether the user is identified among the users within the queue; if the user is identified within the queue, the user experience orchestrator program 110A, 110B may conclude that the user is in the queue. In some embodiments, such as where the queue is physical, the user experience orchestrator program 110A, 110B may use the spatial data and image processing to identify whether the user is present in the physical location associated with the queue, and/or use biometric data to determine whether the user is exhibiting behaviors consistent with waiting, such as standing in a line of other users and/or standing still for long periods of time, et cetera. The user experience orchestrator program 110A, 110B may determine if the user is taking part in the MR experience by, for example, consulting the queue and/or past versions of the queue to determine if the user recently reached the first position in line before being taken off the queue, and/or use sensors 108 to identify the user as wearing a mixed reality device 118, being physically present within the bounds delineated for the mixed reality experience, et cetera. The user experience orchestrator program 110A, 110B may make this determination continuously at regular intervals, and may track the position of users relative to the queue or the MR experience in real time or substantially real time.

In some embodiments of the invention, determining whether the user is in a queue line or immersed in the MR experience may include a queue analysis to determine which individuals waiting to enter a mixed reality experience should be considered users of a mixed reality experience for the purposes of including the users within the co-evolution step of the user experience orchestration process. The co-evolution step may be a step where the user experience orchestrator program 110A, 110B uses the experiential state or alterations to the experience parameters of participants to facilitate communication with or alter the experiential state of users in the queue, or to attract individuals to join the queue and become users. The user experience orchestrator program 110A, 110B may identify individuals waiting to enter the mixed reality experience as users based on the immediateness of the participant about to initiate the experience, and may perform initial categorization and user pre-classification based on historic experiences. The queue analysis may include pre-selection of a vehicle based on participant categorization affinity, or ca. This ca value is a contingency parameter needed when vehicles have limited or low intersecting configuration parameters. For example, one vehicle accepts X values between 20 and 60, and another vehicle accepts X values between 50 and 90. This value is important if pre-selecting in function of User Experience Coefficient (UXC) defined in the next step. The user experience orchestrator program 110A, 110B may determine a line break point beyond which individuals in the queue might be too far back to initiate in the experience. This returns a headcount number h, which may represent the number of individuals within the line break point. The user experience orchestrator program 110A, 110B may calculate a critical mass coefficient k, which may be a dynamically calculated threshold indicating the minimum set of participants needed in a queue. k may calculated in function of vehicles available c, duration of the experience d, time for the participants to move in and out t, and the number of participants needed to maximize utilization of vehicle n. Possible values include:

k=1 critical mass
k<1 subcritical mass
k>1 supercritical mass

The outputs from the line analysis step may be ca, h, and k. These values may be used later when deriving the CUE-O and remediation models.

At 212, the user experience orchestrator program 110A, 110B may determine the experiential state of the user based on the biometric data, stress level, sentiment, and spatial context of the user, and whether the user is in a queue line or immersed in the MR experience. The experiential state of a user, herein also referred to as a User Experience Coefficient or UXC, may be a value quantifying the overall experience of the user within the context of the mixed reality experience on a spectrum, where values towards one end of the spectrum represent unpleasant or poor user experiences, and values on the other end of the spectrum represent positive user experiences. The user experience orchestrator program 110A, 110B may calculate or continuously update the experiential state at regular time intervals throughout the user's time waiting in the queue or taking part in the mixed reality experience, such that the user experience orchestrator program 110A, 110B may model the user's experiential state over time. The user experience orchestrator program 110A, 110B may calculate the experiential state based on a variety of information that may indicate the mental state of the user, and information that indicates the extent to which a given mental state of the user corresponds with a positive experience or a negative experience. Information that may indicate the mental state of the user may include, for example, biometric data of the user, spatial data of the user, stress analysis of the user, sentiment analysis of the user, et cetera. Information that indicates an extent to which a given mental state of the user corresponds with positive or negative experiences may include crowdsourced or historical data, user feedback, machine learning, user preferences, et cetera. The user experience orchestrator program 110A, 110B may calculate two different experiential states; one experiential state calculated from data gathered when the user was in the queue, and one experiential state calculated from data gathered while the user was taking part in the MR experience. In some embodiments, the user experience orchestrator program 110A, 110B may annotate gathered data indicating whether the data was gathered while the user was in the queue or the MR experience.

At 214, the user experience orchestrator program 110A, 110B may compare the experiential state of the user against experiential states associated with compatible previous MR experiences. Here, the user experience orchestrator program 110A, 110B may create a UXC temporal variation index, where the current UXC is compared against previous compatible experiences and a UXC variation index is also annotated. Mixed reality experiences may be compatible when they share characteristics such as intensity, character, et cetera. For example, experiences in a carousel and a teacup ride might be compatible, but experiences in a rollercoaster may not be compatible. The temporal variation index may be intended to provide a way to monitor how the UXC may vary over time while the user is engaged in an activity. This temporal variation index would apply to similar scenarios, such as scenarios where the user is waiting in a queue, or repeatedly entering the same MR experience back-to-back. The user experience orchestrator program 110A, 110B may monitor see and annotate the variations in the user experience during similar activities and use this information to decide whether to make any adjustments to the UXD At 216, the user experience orchestrator program 110A, 110B may map spikes in the experiential state of the user to corresponding parameters of the MR experience. In some embodiments of the invention, the user experience orchestrator program 110A, 110B may create a model to provide a mapping between spikes, or salient features of the user's experiential state over time, and experience parameters to which they correspond. This model may be referred to as the experience enhancing drivers model, or UXD. The user experience orchestrator program 110A, 110B may use the UXD to identify one or more salient features by consulting the UXC over time and identifying regions where the UXC exceeded an upper threshold or fell below a lower threshold, where for example the upper threshold represents a value of the experiential state above which the experiential state can be considered to represent a positive experience, and the lower threshold indicates a value of the UXC below which the UXC can be considered to represent a negative experience. The user experience orchestrator program 110A, 110B may employ additional thresholds, and the thresholds may be established or adjusted, for example, based on machine learning or user feedback. The user experience orchestrator program 110A, 110B may be pre-provided with experience parameter information, which may include a list of all experience parameters present and/or controllable by the user experience orchestrator program 110A, 110B, and may include contextual information regarding experience parameters that may be helpful in determining whether and when a user encountered a given experience parameter. For example, the contextual information may include the location of experience parameters that are bound to a location, or the location of experience parameters that are mobile (train, virtual creature) at regular intervals. For more abstract experience parameters, such as motion, visual or audio effects, traits such as speed or acceleration, et cetera, the contextual information may include the times at which the effects or conditions were present and/or the users or area affected by the effects or conditions. The user experience orchestrator program 110A, 110B may compare the time intervals corresponding with the salient features to the user's location during those time intervals. The user experience orchestrator program 110A, 110B may determine what experience parameters were visible to the user, producing an effect on the user, or otherwise present in the vicinity of the user such that the experience parameter may have contributed to the salient feature of the user's UXC, and may mark such experience parameters as potential experience parameters. For example, the user experience orchestrator program 110A, 110B may use cameras to identify where the user was looking, and may identify all visible experience parameters in that direction as potential experience parameters. In some embodiments of the invention, the UXD outputs all potential experience parameters associated with the salient features. In some embodiments the user experience orchestrator program 110A, 110B may use machine learning methods to identify a likelihood that any given potential experience parameters contributed to or caused the salient feature in the user's UXC based on patterns previously identified; for example, the user experience orchestrator program 110A, 110B may determine a likelihood based on whether the same type of experience parameters produced a similar effect on the experiential state of similar users in the past, whether the same type of experience parameters produced a similar effect on the experiential state of the same user in the past, et cetera.

At 218, the user experience orchestrator program 110A, 110B may, based on the mapping, model the relationships between the experience parameters and the user's experiential state. The user experience orchestrator program 110A, 110B may create a co-evolved user experience orchestrator (CUE-O) model from the UXC and the output of the UXD. The CUE-O model represent the relationship between the different experience parameters and how the users respond to them. Based on the CUE-O, the user experience orchestrator program 110A, 110B may implement a communication and information exchange method between the users participating in the experience and those waiting in line, referred to as co-evolution. The CUE-O model enables the user experience orchestrator program 110A, 110B to analyze in real time the user's current state, derive user preferences from previous experiences and predict what parameters could be altered that will result in a better experience.

The user experience orchestrator program 110A, 110B may use the CUE-O model to derive user preferences by analyzing the experience parameters corresponding with salient features of the user's experiential state and determining which experience parameters produce a positive effect on the user's experience, and which experience parameters have a negative effect on the user's experience. The user experience orchestrator program 110A, 110B may predict changes to the experience parameters that would produce a positive effect on the user's experiential state, based on, for example, how changes to such experience parameters affected the experiential state of similar users in the past. Additionally, based on analysis of UXDs belonging to many users over time, the user experience orchestrator program 110A, 110B may identify relationships between experience parameters, such that a user's positive or negative experiences with certain experience parameters or combinations of experience parameters may be predictive of how related experience parameters may affect the user's experiential state. In some embodiments of the invention, experience parameters which are related, such that changes to all related experience parameters produce a unified effect on a user's experience, may be grouped together. For example, experience parameters such as speed, acceleration, vibrancy of a virtual environment, volume, aggression of virtual monsters, et cetera may all be relevant to the intensity of the experience, such that increasing all such parameters increases the intensity, and decreasing the parameters decreases intensity, and may be grouped together.

In some embodiments of the invention, the user experience orchestrator program 110A, 110B may user the CUE-O model to perform co-evolution, which may include facilitating interaction between participants and users in the queue to improve the experiential state for one or both groups. Co-evolution may include adjusting the mixed reality experience for a participant based on the experiential state of users in the queue. For example, if User B waiting in line is too calm and doesn't seem interested in the experience, the user experience orchestrator program 110A, 110B could alter experience parameters to increase the intensity of the mixed reality experience that User A is currently taking part in. The altered experience parameters for User A may be kept for User B for when User B takes part in the MR experience. Co-evolution may also include communicating the experiential state of participants to users in the queue to improve the experiential state of the users in the queue; for example, the user experience orchestrator program 110A, 110B may EXAMPLE.

At 220, the user experience orchestrator program 110A, 110B may trigger one or more remedial actions based on the modeled relationships. In some embodiments of the invention, the user experience orchestrator program 110A, 110B may execute remedial actions to implement the predicted changes to the mixed reality experience. The remedial actions may be any actions that serve to carry out the predicted changes to the experience parameters. The user experience orchestrator program 110A, 110B may electronically interface with mechanical and software components of the mixed reality experience such that the user experience orchestrator program 110A, 110B may send commands to execute the changes in both hardware and software environments. In some embodiments to the invention, alterations to grouped experience parameters may be executed simultaneously. In embodiments where changes to an experience parameter would affect multiple participants, the user experience orchestrator program 110A, 110B may only make the changes where the user experience orchestrator program 110A, 110B predicts that the changes would have a neutral or positive effect on the experiential state of all affected participants. In some embodiments, for example where queue analysis determines that the number of users in the queue is below a desired number, the user experience orchestrator program 110A, 110B may communicate with nearby individuals with compatible experiential states to join the queue, for example utilizing synthesized or recorded speech through speakers, messages to the user's mobile device, via displays, augmented reality graphical elements, et cetera.

Figure 3:
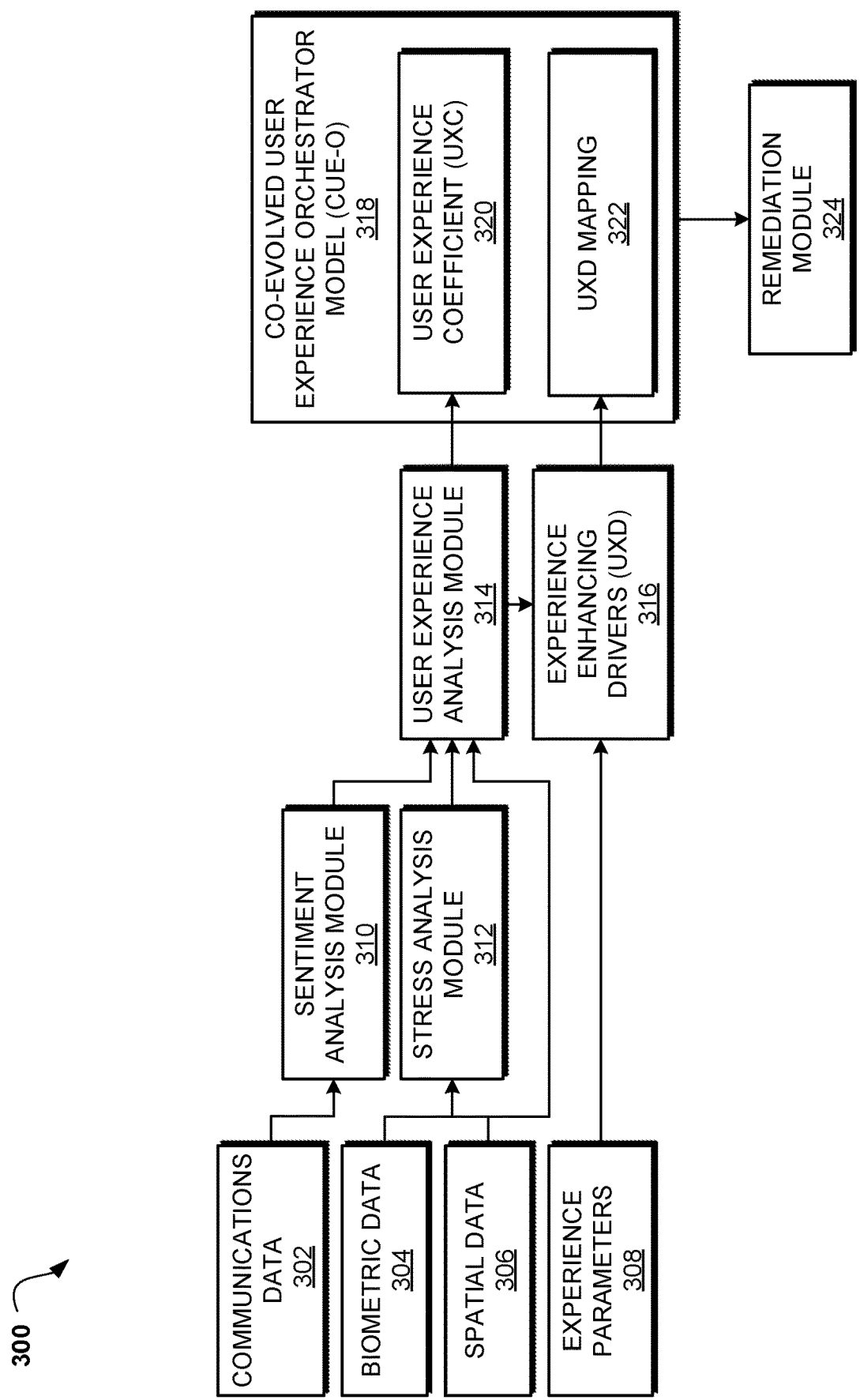
FIG. 3 is a block diagram illustrating an exemplary system implementing the user experience orchestration process according to at least one embodiment.

Referring now to FIG. 3, a block diagram illustrating an exemplary system 300 implementing the user experience orchestration process 200 is depicted according to at least one embodiment. The user experience orchestrator program 110A, 110B utilizes four different types of data: communications data 302, biometric data 304, spatial data 306, and experience parameters 308.

The sentiment analysis module 310 may accept communications data 302 as input, and transmit sentiment modeling as output to user experience analysis module 316. The sentiment modelling may include inferring the current view or attitude of a user towards the mixed-reality experience or any of the virtual or physical elements comprising the mixed-reality experience. Sentiment modelling may include processing communications data 302 pertaining to a user using text processing techniques such as entity and corpus linguistic methods and/or speech processing methods to determine the user's sentiment at any given moment during the user's participation in the mixed reality experience; the sentiment analysis module 310 may further attempt to determine whether the sentiment is directed towards the mixed reality experience, and if so, what mixed reality elements the sentiment is particularly directed to.

The stress analysis module 312 may accept biometric data 304, spatial data 306, and sentiment modelling 318 from sentiment analysis module 310 as inputs, and may transmit a user experience coefficient (UXC) 320 to CUE-O 316 and experience analysis module 314. The stress analysis module 312 may perform a stress analysis based on the biometric data 304 and spatial data 306; the stress analysis may be a method of determining the mental stress, or cognitive workload, affecting a user, and may be determined from biometric data 304 to determine a mental state; a user may indicate a level of stress through their behavior and/or through involuntary physiological changes. Movement of the user, based on spatial data 306, may also indicate behaviors that imply stress, such as pacing.

The user experience analysis module 314 may calculate the UXC 320 based on the sentiment modeling from sentiment analysis module 310, the stress analysis from stress analysis module 312, the spatial data 306, and the biometric data 304; the UXC 320, or experiential state of a user, may be a value quantifying the overall experience of the user within the context of the mixed reality experience on a spectrum, where values towards one end of the spectrum represent unpleasant or poor user experiences, and values on the other end of the spectrum represent positive user experiences. The user experience analysis module 314 may output the UXC 320 to the experiencing enhancing drivers (UXD) 316.

The experience enhancing drivers (UXD) 316 may accept experience parameters 308 and UXC 320 from user experience analysis module 314 as inputs, and may use them to generate a mapping 322 between the UXC 320 and the experience parameters 308. UXD 322 may be a model to provide a mapping 322 between spikes, or salient features of the user's experiential state over time, and experience parameters to which the salient features correspond. UXD 316 may transmit the UXD mapping 322 to CUE-O 318.

The CUE-O 318 may accept the UXC 320 from user experience analysis module 314, and UXD mapping 322 from the experience enhancing drivers (UXD) 316 as inputs. The CUE-O 318 may derive user preferences by analyzing the experience parameters corresponding with salient features of the user's experiential state and determining which experience parameters produce a positive effect on the user's experience, and which experience parameters have a negative effect on the user's experience. The CUE-O 318 may predict changes to the experience parameters that would produce a positive effect on the user's experiential state, based on, for example, how changes to such experience parameters affected the experiential state of similar users in the past. Additionally, based on analysis of UXDs belonging to many users over time, the CUE-O 318 may identify relationships between experience parameters, such that a user's positive or negative experiences with certain experience parameters or combinations of experience parameters may be predictive of how related experience parameters may affect the user's experiential state. The CUE-O 318 may then transmit one or more predicted alterations to remediation module 324.

Remediation module 324 accepts one or more predicted alterations as output from CUE-O 318. Based on the probability, remediation module 324 executes the one or more predicted alterations as one or more the remedial actions. Remediation module 324 may execute remedial actions to implement the predicted changes to the mixed reality experience. The remedial actions may be any actions that serve to carry out the predicted changes to the experience parameters. The remediation module 324 may electronically interface with mechanical and software components of the mixed reality experience such that the remediation module 324 may send commands to execute the changes in both hardware and software environments.

It may be appreciated that FIGS. 2-3 provides only illustrations of individual implementations and do not imply any limitations with regard to how different embodiments may be implemented. Many modifications to the depicted environments may be made based on design and implementation requirements.

Figure 4:
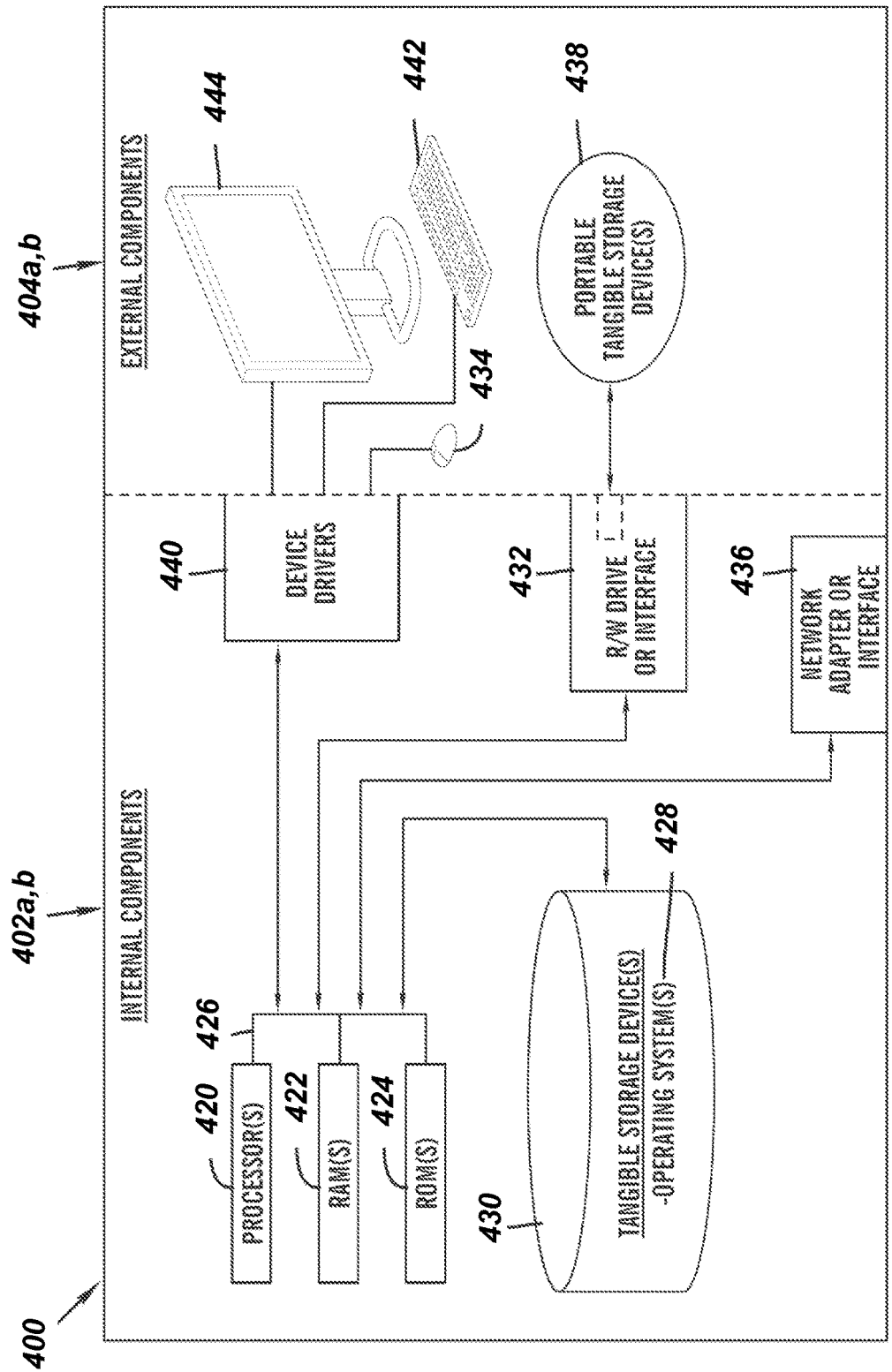
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the user experience orchestrator program 110A in the client computing device 102, and the user experience orchestrator program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the user experience orchestrator program 110A, 110B, can be stored on one or more of the respective portable computer-readable tangible storage devices 438, read via the respective RAY drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The user experience orchestrator program 110A in the client computing device 102 and the user experience orchestrator program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the user experience orchestrator program 110A in the client computing device 102 and the user experience orchestrator program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
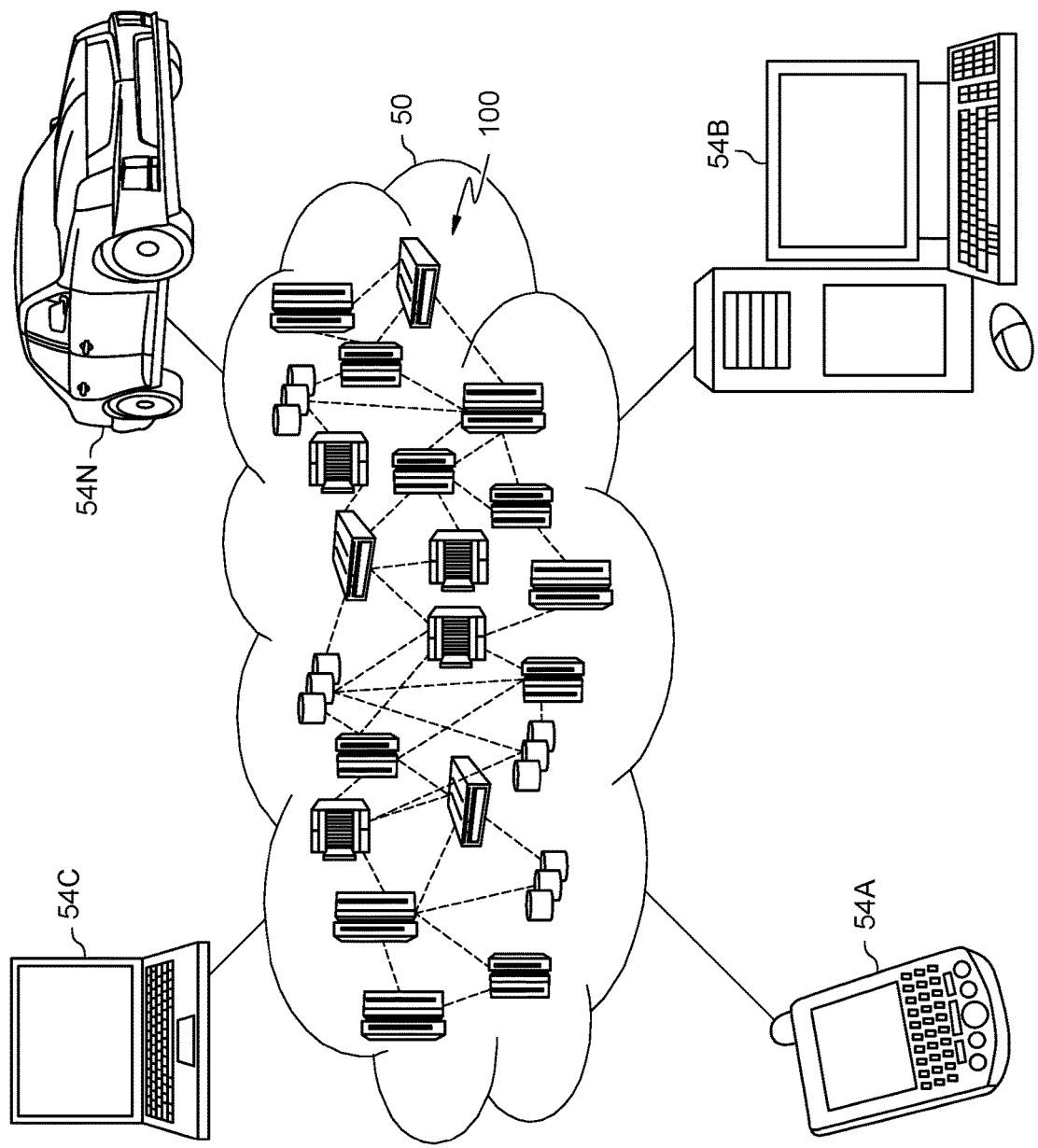
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
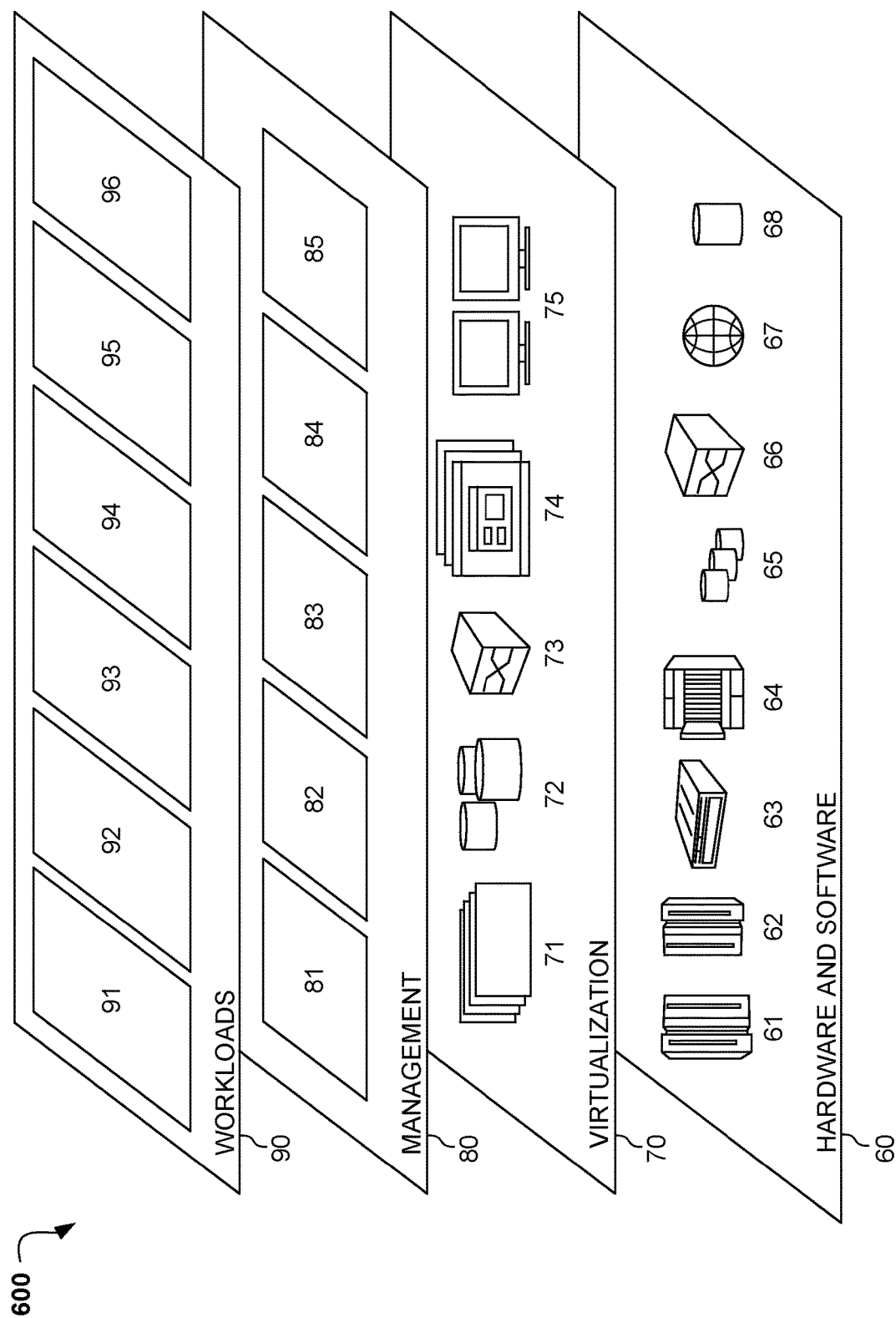
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user experience orchestration 96. The user experience orchestrator 96 may be enabled to analyze the current state of a user participating in a mixed-reality (MR) experience, derive user preferences from previous experiences, and thereby predict what parameters of the MR experience could be altered to improve the user's experience.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for customizing a mixed-reality experience based on an experiential state of at least one user, the method comprising:
    modeling the experiential state of the at least one user participating in the mixed-reality experience;
    modeling one or more relationships between the experiential state of the at least one user and one or more physical and virtual experience parameters comprising the mixed-reality experience;
    based on the one or more modeled relationships, predicting one or more alterations to the one or more physical and virtual experience parameters to produce a positive effect on an experiential state of the at least one user based on a sentiment analysis of the at least one user; and
    operating a mixed reality system to perform one or more actions to execute the one or more predicted alterations.

2. The method of claim 1, wherein the at least one user comprises at least a first user and a second user, and wherein the one or more alterations to the physical and virtual experience parameters of the mixed reality experience of the first user are predicted to produce a positive effect on an experiential state of the second user.

3. The method of claim 1, wherein the at least one user comprises at least a first user and a second user, and wherein the first user is immersed in the mixed-reality experience and the second user is in a queue to join the mixed-reality experience.

4. The method of claim 1, wherein the at least one user comprises at least a first user and a second user, and wherein at least one of the actions comprises communicating with the second user based on the experiential state of the first user.

5. The method of claim 1, wherein the experiential state of the at least one user is modeled based on determining that the at least one user is immersed in the mixed-reality experience or is in a queue to join the mixed reality experience.

6. The method of claim 1, wherein the actions comprise identifying and pre-categorizing one or more individuals comprising a queue to join the mixed-reality experience.

7. The method of claim 1, further comprising;
    responsive to determining that a number of individuals comprising a queue to join the mixed-reality experience falls below a threshold, requesting that one or more additional individuals join the queue based on one or more experiential states of the one or more additional individuals.

8. A computer system for customizing a mixed-reality experience based on an experiential state of at least one user, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    modeling the experiential state of the at least one user participating in the mixed-reality experience;
    modeling one or more relationships between the experiential state of the at least one user and one or more physical and virtual experience parameters comprising the mixed-reality experience;
    based on the one or more modeled relationships, predicting one or more alterations to the one and more physical or virtual experience parameters to produce a positive effect on an experiential state of the at least one user based on a sentiment analysis of the at least one user; and operating a mixed reality system to perform one or more actions to execute the one or more predicted alterations.

9. The computer system of claim 8, wherein the at least one user comprises at least a first user and a second user, and wherein the one or more alterations to the physical and virtual experience parameters of the mixed reality experience of the first user are predicted to produce a positive effect on an experiential state of the second user.

10. The computer system of claim 8, wherein the at least one user comprises at least a first user and a second user, and wherein the first user is immersed in the mixed-reality experience and the second user is in a queue to join the mixed-reality experience.

11. The computer system of claim 10, wherein the at least one user comprises at least a first user and a second user, and wherein at least one of the actions comprises communicating with the second user based on the experiential state of the first user.

12. The computer system of claim 8, wherein the experiential state of the at least one user is modeled based on determining that the at least one user is immersed in the mixed-reality experience or is in a queue to join the mixed reality experience.

13. The computer system of claim 8, wherein the actions comprise identifying and pre-categorizing one or more individuals comprising a queue to join the mixed-reality experience.

14. The computer system of claim 8, further comprising; responsive to determining that a number of individuals comprising a queue to join the mixed-reality experience falls below a threshold, requesting that one or more additional individuals join the queue based on one or more experiential states of the one or more additional individuals.

15. A computer program product for customizing a mixed-reality experience based on an experiential state of at least one user, the computer program product comprising:

one or more computer-readable tangible storage medium and program instructions stored on at least one of the one or more tangible storage medium, the program instructions executable by a processor to cause the processor to perform a method comprising:

modeling the experiential state of the at least one user participating in the mixed-reality experience;

modeling one or more relationships between the experiential state of the at least one user and one or more physical and virtual experience parameters comprising the mixed-reality experience;

based on the one or more modeled relationships, predicting one or more alterations to the one or more physical and virtual experience parameters to produce a positive effect on an experiential state of the at least one user based on a sentiment analysis of the at least one user; and operating a mixed reality system to perform one or more actions to execute the one or more predicted alterations.

16. The computer program product of claim 15, wherein the at least one user comprises at least a first user and a second user, and wherein the one or more alterations to the physical and virtual experience parameters of the mixed reality experience of the first user are predicted to produce a positive effect on an experiential state of the second user.

17. The computer program product of claim 15, wherein the at least one user comprises at least a first user and a second user, and wherein the first user is immersed in the mixed-reality experience and the second user is in a queue to join the mixed-reality experience.

18. The computer program product of claim 17, wherein the at least one user comprises at least a first user and a second user, and wherein at least one of the actions comprises communicating with the second user based on the experiential state of the first user.

19. The computer program product of claim 15, wherein the experiential state of the at least one user is modeled based on determining that the at least one user is immersed in the mixed-reality experience or is in a queue to join the mixed reality experience.

20. The computer program product of claim 15, wherein the actions comprise identifying and pre-categorizing one or more individuals comprising a queue to join the mixed-reality experience.

* * * * *